United States Patent
Bellucci et al.

(10) Patent No.: US 7,144,535 B2
(45) Date of Patent: Dec. 5, 2006

(54) PROCEDURE FOR THE PREPARATION OF A HIGHLY DURABLE COMPOSITE TEXTILE MATERIAL WORKABLE AT HIGH TEMPERATURE, AND THE COMPOSITE TEXTILE MATERIAL THUS OBTAINED

(75) Inventors: Andrea Bellucci, Amelia (IT); Walter Cardinali, Cerqueto di Marsciano (IT); Enzo Cicotti, Sangemini (IT); Salvatore Consoli, Mestre (IT)

(73) Assignee: Alcantara S.p.A., Milan (IT)

( * ) Notice: Subject to any disclaimer, the term of this patent is extended or adjusted under 35 U.S.C. 154(b) by 410 days.

(21) Appl. No.: 10/325,695

(22) Filed: Dec. 19, 2002

(65) Prior Publication Data
US 2003/0151154 A1  Aug. 14, 2003

(30) Foreign Application Priority Data
Dec. 21, 2001  (IT) ............ MI2001A2779

(51) Int. Cl.
*B29C 67/00*  (2006.01)
(52) U.S. Cl. ............ 264/136; 264/331.16; 524/840
(58) Field of Classification Search ............ 264/136, 264/331.16; 524/840
See application file for complete search history.

(56) References Cited

U.S. PATENT DOCUMENTS

| 5,294,342 | A | * | 3/1994 | Donato ............ 210/639 |
|---|---|---|---|---|
| 5,648,151 | A | * | 7/1997 | Mizoguchi et al. ......... 428/220 |
| 5,770,264 | A | * | 6/1998 | Munzmay et al. .......... 427/323 |
| 5,798,165 | A | | 8/1998 | Mizoguchi et al. |
| 6,084,051 | A | * | 7/2000 | Blum et al. ............ 528/71 |
| 6,162,863 | A | * | 12/2000 | Ramalingam ............ 524/591 |
| 6,362,273 | B1 | * | 3/2002 | Martin et al. ............ 524/591 |
| 6,479,153 | B1 | * | 11/2002 | Kato et al. ............ 428/423.7 |
| 6,632,858 | B1 | * | 10/2003 | Pears et al. ............ 523/160 |

FOREIGN PATENT DOCUMENTS

| CA | 818618 | A | * | 1/1968 |
|---|---|---|---|---|
| EP | 584 511 | | | 3/1994 |
| IT | 1255654 | | | 8/1992 |

* cited by examiner

*Primary Examiner*—Mark Eashoo
(74) *Attorney, Agent, or Firm*—Pauley Petersen & Erickson

(57) ABSTRACT

A high durability composite textile material, like a synthetic suede, is prepared according to a procedure that comprises the impregnation of micro-fibers non-woven fabric substrate with a polyurethane-polyurea solution. This polymer solution, is made by a pre-polymerization phase between diisocyanate and polyols, a dilution phase of the pre-polymer thus obtained and an extension step of the pre-polymer, the extension of the pre-polymer free isocyanate groups is carried out by means water addition.

19 Claims, No Drawings

PROCEDURE FOR THE PREPARATION OF A HIGHLY DURABLE COMPOSITE TEXTILE MATERIAL WORKABLE AT HIGH TEMPERATURE, AND THE COMPOSITE TEXTILE MATERIAL THUS OBTAINED

The present invention relates to a procedure for the production of a durable composite textile material and the related material, having high porosity and high-temperature resistance

STATE OF THE ART

Processes "woven" or "micro-fibrous" synthetic composites production are already known. In these processes, polyurethane-polyurea solution is produced in parallel with a micro-fiber substrate which it is applied, to obtain an artificial suede leather, to subject to further treatment. A process of this type is described in Italian Patent no. 1255654 and European patent no. 93111292.4, to which reference will be made for all further description of the characteristics of the material.

The technique of polyurethanes or polyurethanes-polyurea production has been known for a long time. It involves, at first, a reaction between polyethers and/or polyester diols of approximately 2,000 molecular weight with organic diisocyanate in a reactor, named as "pre-polymerization" phase. After dilution with solvent to a pre-polymer concentration of approximately 20 to 30%, the polymerization reaction is completed with diols to obtain polyurethanes, or with amine or water to obtain polyurethane-polyurea in an extension phase The urethane link is formed by the following reactions:

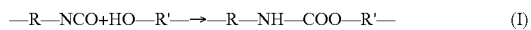
$$-R-NCO+HO-R' \rightarrow -R-NH-COO-R'- \quad (I)$$

the ureic link is obtained by reaction between the isocyanate and amine groups:

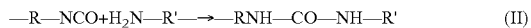
$$-R-NCO+H_2N-R' \rightarrow -RNH-CO-NH-R' \quad (II)$$

or between isocyan groups and water according to the reactions:

$$-R-NCO+H_2O \rightarrow -R-NH-COOH \quad (III)$$

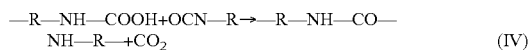
$$-R-NH-COOH+OCN-R \rightarrow -R-NH-CO-NH-R-+CO_2 \quad (IV)$$

Alcohols or monofunctional amines (commonly called stoppers) are generally employed to control the increase in the molecular weight of the polymer. Moreover, metallorganic catalysts can be added to accelerate the reactions, for example, tin-dibutyldilaurate or tin-tributylacetate or the cobaltnaphtanate In a polymer like previously defined one, the segment coming from the polyol is defined as "soft segment" while the other one, coming from diisocyanate and chain extender molecules, is defined as "hard segment". The polymers with ureic type "hard segments" have better performances than urethane type ones, both in terms of the toughness characteristics of dry film obtained from them, and the resistance to high temperatures (higher melting point) of the films themselves. The melting point measurement, was done by DSC (differential scansion calorimetry) in nitrogen, over a temperature range of $-100$ to $+300°$ C. and with an increasing temperature rate of $10°$ C./minute.

Even with these differences, both the polymers with "hard segments" like urethane type and those whose "hard segments" are ureic type, obtained in solution, are widely used beyond the field of artificial leather and synthetic suede composites, also in numerous other fields such as, for example, those of adhesives and sealants. The synthetic artificial leather and suede, deriving from both types of polymers obtained with the known processes outlined above, have some disadvantages, when the "hard segments" part consists of aromatic isocyanate such as, for example, 2-4/2-6 toluenediisocyanate, in whatever ratio of isomers 2-4/2-6, or 4-4'-diphenylmethanodiisocyanate and with polyether polyol such as, for example, polyoxytetramethyleneglycol, polyoxypropyleneglycol, as "soft-segments". Their resistance to oxidation agents and/or ultraviolet radiation is rather limited in time and is not enough improved by the addition of anti-oxidant agents and/or U.V. absorbers to the polymer.

On the other hand, if "soft segments" consist of polyester polyols such as, for example, polycaprolactone or polyhexamethyleneadipateglycol, the resistance to ultraviolet radiation of the polymers thus obtained, increases, but their resistance to hydrolysis is drastically reduced. Not even when "soft segments" consist of mixtures of polyether and polyester polyols can a polymer be obtained with sufficient resistance to oxidating agents and ultraviolet radiation. With "soft segments" consisting of polycarbonate polyols, instead, produced polymers are characterised by high resistance to both ultraviolet radiation and to hydrolysis; the hardness of the obtained polyurethane, however, makes its employment in the field of artificial leather and synthetic suede difficult. Using them, in mixtures with polyester polyols, high resistance can be maintained and polyurethane becomes more flexible and therefore adapted to employment in the field of artificial leather.

The combination of ultraviolet radiation and hydrolysis resistance of artificial leather and synthetic suedes is commonly named as "durability". The aging tests that are employed to measure "durability" in the case of artificial leather and synthetic suede are:

Aging by U.V. Beams (called Xenotest 1.200, for short) carried out with Xenotest 1,200 CPS equipment under the following conditions: relative humidity, $20\pm10\%$; temperature of the black panel, $100\pm3°$ C.; irradiation power, $60W/m^2$; exposure time 138 h.

Hydrolysis Resistance (called "Jungle Test" for short) carried out in a climatic room under the following conditions: temperature, $75\pm1°$ C.; relative humidity, $90\pm3\%$; exposure time 5–7–10 weeks.

After the aging tests, the durability is measured by the following way:

Weight loss and/or appearance are measured (second one, by visual comparison with 5 standard samples scale) after the material has been subjected to an abrasion test with the Martindale abrasimeter (20,000 cycles at a pressure of 12 Kpa).

Variation of the Molecular weight Mn measured by GPC (Gel Permeation Chromatography), after polyurethane extraction from the micro-fibrous composite with dimethylformamide and dilution with tetrahydrofuran. Calibration curve has been made by Polystyrene standards samples.

Variation of the mechanical characteristics: in particular tensile strength.

In U.S. Pat. No. 5,798,165, is described a procedure to produce a porous-type polyurethane composite, with good damp coagulability and embossability, excellent durability and flexibility at low temperatures; "soft segments" consist, of mixtures of polycarbonate polyols made up of pentamethyleneglycols and/or hexamethyleneglycols and polyester polyols made up of tetramethyleneglycols, diethyleneglycols or dipropyleneglycols esterified with dicarboxylic acids having from 6 to 10 carbon atoms; the hard segments, consist of an aromatic diisocyanate, ethyleneglycols and/or 1–4 butandiol.

Despite the polyurethane generated by the process described above shows an excellent durability, has the disadvantage of softening or melting at a temperature below 170° C., for which reason polyurethane composite deriving from it does not withstand high temperature working processes such as, for example, coupling to other substrates, printing, embossing and lamination. The softening or melting of the polyurethane causes the composite to lose its porosity characteristics, become compacted and thus loses its hand and softness characteristics.

DESCRIPTION OF THE INVENTION

It has now been discovered that a composite material can be obtained from a micro-fibrous non-woven fabric felt, incorporated in a polyurethane binder that has all the characteristics defined above and the further property of being able to be subjected to treatments that involve exposure to temperatures in excess of 250° C. without the problems mentioned above.

To obtain this characteristic, the "Soft segments" of the polyurethane-polyurea utilised to impregnate the micro-fibrous substrate must consist of a mixture of polycarbonate/polyester polyols while "hard segments" must consist of ureic groups derived from aromatic diisocyanates and, preferably deriving from the reaction between 4,4'-diphenyl-methano-diisocyanate and water, according to reactions III and IV reported above, so as to generate the extension agent directly in the reactor.

For the practical realization of the present invention, the polycarbonate diols can be chosen from polypentamethylenecarbonatoglycol, polyhexamethylenecarbonatoglycol and the polyheptamethylenecarbonatoglycol, while the polyester polyols can be chosen from polyhexamethyleneadipateglycol, polyneopentyladipateglycol, polytetramethyleneadipateglycol or polycaprolactonediol.

As asserted above, the practical use of the present invention is not limited to the production of artificial leather, even though the description is mainly directed to this application, but can be applied in all cases which a polyurethane, with good mechanical properties and high abrasion resistance, is required.

An aromatic organic diisocyanate, like as 2–4/2–6 toluenediisocyanate, has been used, in whatever 2–4/2–6 isomers ratio (preferably 80/20), or 4–4' diphenylmethanodiisocyanate alone or as a mixture with 2–4 isomer, in a weight ratio between 0.01% and 50% of 2–4' isomer or such as the mixtures of toluendiisocyanate and of diphenylmethanodiisocyanate in whatever ratio of their isomers.

Preferential solvents are N,N-dimethylformamide, N,N-dimethylacetamide, dimethylsulphoxide, acetone, methylchetone, tetrahydrofuran and N-methyl-pyrolidone.

As pointed out above, the solvents employed for the dilution and the extension reaction of the pre-polymer can have a humidity content of between 0.001% and 0.45% by weight. In an industrial process, the solvent can be recovered from the solution by distillation, after the polymer solution has been used. Where the solvent is DMF, it has humidity content of approximately 0.03% by weight after distillation; in the following examples, reference to DMF will mean this type, unless otherwise stated.

In the particular application of the invention to the production of micro-fibrous composites, these ones are prepared in the following way:

A fiber staple is first prepared, formed from micro-fibers of polyethyleneterephthalate, polytrimethyleneterephthalate or polyamide—6 or 6—6 with size from 0.01 to 0.4 denier, and preferably of the order of 0.08 to 0.15 denier, in a polystyrene or of a styrene co-polymer matrix that acts as a bulking "sheath". In general, the fiber staple has the following characteristics: from 1.4 to 10 denier and preferably from 3.4 to 3.8 denier; length from 40 to 60 millimeters, and preferably of the order of 49 to 51 millimeters; stretch ratio from 2/1 to 5/1; curl from 4 to 15 per centimeter. Moreover, the fiber staple can contain 50 to 80 parts by weight of polyethyleneterephthalate, polytrimethyleneterephthalate or polyamide—6 or 6—6, 20 to 50 parts by weight of polystyrene matrix and finally approximately 3 parts by weight of polyethyleneglycols, which is being incorporated into the polystyrene matrix.

A raw felt is prepared with this fiber staple which is subjected to needle-punching to form a needle-punched felt having conveniently a density of the order of 0.15 to 0.35 $g/cm^3$. The needle-punched felt is therefore immersed in an aqueous solution, for example 20% by weight and, after drying, is immersed in a chlorinated solvent, such as—for example: tryeline or perchloroethylene, until the polystyrene matrix dissolves. The resulting product is dried and constitutes the non-woven fabric of micro-fibers of polyethyleneterephthalate, polytrimethyleneterephthalate or polyamide—6 or 6—6, onto which the polyurethane elastomer is applied.

Polyhexamethylenecarbonatoglycol with molecular weight approximately 1,900 to 2,100 is used as polycarbonate-diol of preference. Polyneopentyladipateglycol with molecular weight approximately 1,900 to 2,100 is preferably used as polyester-diol. In the mixture of the diols the weight ratio between polycarbonate-diol and the polyester-diol can generally vary from 80/20 to 40/60 with optimum values from 70/30 to 50/50.

Among the previously listed isocyanates, 4—4' diphenyl-methano-diisocyanate is preferred.

In the preparation of the intermediate pre-polymer, organic diisocyanate is conveniently made to react with the mixture of the diols in a molar ratio between 2.9 and 3.9 and preferably between 2.9 and 3.0 operating with a reaction time of 2 to 5 hours, at a temperature of 40 to 90° C., in the presence or absence of a solvent or diluent.

Where a solvent has not already been employed, the pre-polymer is dissolved in an organic solvent, preferably N,N-dimethylformamide or N,N-dimethylacetamide and extended by reacting it with water, using a water/diol molar ratio of between 1.51 and 1.78, and preferably between 1.72 and 1.78, with respect to the diols used to form the pre-polymer, and operating at a temperature between 25 and 80° C. approximately.

Conveniently, the diluted water solution is gradually added to the same organic solvent used in pre-polymerization or to dilute the pre-polymer. The reaction can be carried out in the presence of an aliphatic monoamine, in particular of n-dibutylamine, in the order of 0.012 to 0.334 moles per mole of diol.

The non-woven fabric of polyethyleneterephthalate, polytrimethyleneterephthalate or polyamide—6 or 6—6 microfibers is then impregnated by immersion in the polyurethane elastomer solution described above, the impregnated fabric is then squeezed by passage through a pair of rollers and coagulation in water is proceeded to, for example at 20 to 50° C. A coagulated sheet is thus obtained that it is immersed in warm water, for example at approximately 80° C., to extract the residual solvent and the polyvinyl alcohol. The sheet is dried, cut along the thickness in the order of 0.6 to 1.5 millimeters and subjected to emery polishing to raise the surface hair. The raw micro-fibrous synthetic composite non-woven fabric thus obtained, is subjected to dyeing, drying and final finishing.

It can be used as it is or hot worked, up to a temperature of 250° C., for processes such as, for example, coupling to other substrates, printing, embossing and lamination.

The micro-fibrous synthetic composite non-woven fabric thus obtained has good general characteristics and, compared to the products of the present art, it has improved characteristics in relation to its durability, resistance to temperatures up to 250° C. and high porosity even after coupling with other substrates. In fact, the carbon dioxide generated during the extension phase (reactions III and IV), remains mostly dissolved in the same solvent; it is released during the coagulation process, conferring in this way high porosity on the polymer obtained. Moreover, the employment of water as chain extender allows, beyond reducing the extension time of the pre-polymer, all the disadvantages related to the toxicity of the aromatic di-amine used in the present art to be overcome.

The examples that follow will serve to better clarify the object of the present invention.

In the description of the examples, the following abbreviations have been used for the raw materials employed.

| ABBREVIATION | COMPOUND |
| --- | --- |
| PTHF | Polyoxytetramethyleneglycol |
| PPG | Polyoxypropyleneglycol |
| PCL | Polycaprolactonediol |
| PNA | Polyneopentiladipateglycol |
| PMPA | Poly 3-methyl-pentamethyleneadipateglycol |
| PHA | Polyhexamethyleneadipateglycol |
| PHC | Polyhexamethylenecarbonatoglycol |
| PPHC | Polypentamethylene-co-hexamethylenecarbonatoglycol |
| PPC | Polypentamethylenecarbonatoglycol |
| PDPA | Polydipropyleneadipateglycol |
| PBA | Polybutylenadipateglycol |
| TDI | 80/20 2-4/2-6 Toluenediisocyanate |
| MDI | 4-4' Diphenylmethanodiisocyanate |
| IPDI | 3-Isocianomethyl 3,5,5-trimethyl cyclohexyl isocyanate |
| MEG | Monoethyleneglycols |
| IPDA | 3-Aminomethyl 3,5,5-trimethylcyclohexylamine |
| DBA | Dibutylamine |
| DBTDL | Dibutyldilaurate di stagno |
| DMF | N,N-Dimethylformamide |
| DMAC | N,N-Dimethylacetamide |

Examples n. 1, 2, 3 and 4 are used as reference for felts preparation from polyethyleneterephthalate (felt D1), polyamide—6 (felt D2), polyamide—6—6 (felt D3) and polytrimethyleneterephthalate (felt D4); which felts, have been then impregnated with polyurethanes and polyurethanes-polyurea obtained in the next examples. Examples 5, 6 and 7 are used as reference base for the invention, while examples 8–23 are additional examples of the invention.

EXAMPLE NO 1

A fiber staple, formed from micro-fibers of polyethyleneterephthalate (0.10 to 0.11 denier), was prepared in a polystyrene matrix, with the following characteristics: 3.8 denier, length 51 millimeter, 5 curls/cm, stretch ratio 2.5/1. In particular, the fiber was formed by 57 parts by weight of polyethyleneterephthalate micro-fiber, 40 parts by weight of polystyrene matrix and 3 parts by weight of polyethylene glycols, last one contained in the polystyrene matrix. Microscopic section analysis shows that the fiber is made by 16 micro-fibers of polyethyleneterephthalate incorporated into the polystyrene matrix. A raw felt was prepared from the fiber staple by needle-punching to form a needle-punched felt of density 0.185 g/cm$^3$. The needle-punched felt was immersed into an aqueous polyvinyl alcohol solution of 20% by weight and it was then dried. The needle-punched felt, thus treated, has been subsequently immersed in trichloroethylene until the polystyrene matrix of fibers was completely dissolved, with consequent formation of micro-fiber non-woven fabric of polyethyleneterephthalate. Drying of the non-woven fabric thus formed was then proceeded with, giving an intermediate product called felt D1.

EXAMPLE NO 2

This example repeats example no 1 with the difference of using polyamide—6 in place of the polyethyleneterephtalate, giving an intermediate non-woven fabric called felt D2.

EXAMPLE NO 3

This example repeats example no 1 with the difference of using polyamide—6—6 in place of the polyethyleneterephthalate, giving an intermediate non-woven fabric called felt D3.

EXAMPLE NO 4

This example repeats example no 1 with the difference of using polytrimethyleneterephthalate in place of the polyethyleneterephthalate, giving an intermediate non-woven fabric called felt D4.

EXAMPLE NO 5

266 g of PHC and 114 g of PNA (both of molecular weight 2,000) were reacted with 139.4 g of MDI, using a diisocyanate/diol molar ratio of 2.9/1, in a 2.5 liter capacity reactor with mechanical stirrer, at 65° C. under nitrogen. Three hours after the beginning of the reaction, the pre-polymer thus obtained was cooled to a temperature of 45° C. and diluted with DMF, which humidity content was 0.03%, to give a 25% pre-polymer solution with a free NCO content of 1.46%.

Then, maintaining the temperature at 45° C., 3.1 g of DBA and 5.9 g of Water dissolved in 117.3 g of DMF were added slowly over 5 minutes, so as to have a polyurethane-polyurea with a calculated molecular weight of 43,000. After that, temperature of 65° C. was raised, the reactor has been maintained under agitation for others 8 hours and a polyurethane-polyurea solution, stable in the time, with viscosity of 24,000 mPa·sec at 20° C. has been obtained. The elastomer solution thus prepared was diluted with N,N-dimethylformamide, containing 5.1 g of Irganox 1098 and 15.4 g of Tinuvin 350 to form a 14% solution by weight. By water coagulation of a film of the solution thus prepared, a polymer with high porosity was obtained. Felt D1, prepared as in example 1, was immersed in a solution of the polyurethane elastomer and the impregnated; non-woven fabric thus obtained was squeezed, at first, by a pair of rollers, then immersed for 1 hour in a water bath at 40° C. The coagulated sheet thus obtained was immersed through a water bath at 80° C., to extract the residual solvent and the polyvinyl alcohol. After drying, a micro-fibrous composite sheet was obtained and cut into sheets with thickness of 1 millimeter, and the sheets were then subjected to emery polishing to raise the nap. A raw synthetic non-woven fabric with thickness 0.8 millimeter was obtained and then subjected to dyeing in "JET" equipment, equipped with a "Venturi tube".

In particular, the raw microfibrous synthetic non-woven fabric was passed through the "Venturi tube" for 1 hour, operating at 125° C. and into an aqueous dye bath containing Red Diamix E-FB dispersed coloring, to the amount of 2% by weight of the raw synthetic microfibrous not-woven fabric. At the end of the treatment, a finished dyed synthetic chamois leather was obtained and, after finishing, accelerated ageing tests (Xenotest 1.200 and Jungle Test) have been done.

To appraise the result, the following determinations were carried out on the starting polymer and the finished product:

Melting point of the dry polymer by DSC technique.

Molecular weight (Mn) variation of the polymer extracted from the final product at zero time and after ageing.

Toughness variation in the final product, before and after ageings, under a load of 100 N.

Appearance variation after ageings.

The result of these determinations are reported in Tables I and II.

EXAMPLE NO 6

266 g of PTHF and 114 g of PPG (both of molecular weight 2,000) were reacted with 139.4 g of MDI, using a diisocyanate/diol molar ratio of 2.9/1, in a 2.5 liter capacity reactor with mechanical stirrer, at 65° C. under nitrogen. Three hours after the beginning of the reaction, the pre-polymer thus obtained was cooled to 45° C. and diluted with DMF, which humidity content was 0.03%, to give a 25% pre-polymer solution with a free NCO content of 1.46%.

Then, maintaining the temperature at 45° C., 3.1 g of DBA and 5.9 g of Water dissolved in 117.3 g of DMF were added slowly over 10 minutes, so as to have a polyurethane-polyurea with a calculated molecular weight of 43,000. After that, the temperature was raised to 65° C. and the reactor was maintained under agitation for a further 8 hours, to produce a polyurethane-polyurea solution, stable in time, with viscosity of 25,000 mPa·sec at 20° C. The elastomer solution thus prepared was diluted with N,N-dimethylformamide, containing 5.1 g of Irganox 1098 and 15.4 g of Tinuvin 350 to form a 14% solution by weight. By water coagulation of the solution thus prepared an high porosity film has been obtained.

The polyurethane solution was then used to impregnate a D1 felt, which was subjected to all the operations and characterizations described in Example 5.

To evaluate the final product performances, the following determinations were carried out in comparison between polyurethane dry film and final good:

Melting point of the dry polymer by DSC technique.

Molecular weight (Mn) variation of the polymer extracted from the final product at zero time and after ageing.

Toughness variation in the final product, before and after ageings, under a load of 100 N.

Appearance variation after ageings.

The result of these determinations are reported in Tables I and II.

EXAMPLE NO 7

266 g of PCL and 114 g of PHA (both of molecular weight 2,000) were reacted with 139.4 g of MDI, using a diisocyanate/diol molar ratio of 2.9/1, in a 2.5 liter capacity reactor with mechanical stirrer, at 65° C. under nitrogen. Three hours after the beginning of the reaction, the pre-polymer thus obtained was cooled to a temperature of 45° C. and diluted with DMF, which humidity content was 0.03%, to give a 25% pre-polymer solution with a free NCO content of 1.46%.

Then, maintaining the temperature at 45° C., 3.1 g of DBA and 5.9 g of Water dissolved in 117.3 g of DMF were added slowly over 13 minutes, so as to have a polyurethane-polyurea with a calculated molecular weight of 43,000. After that, temperature of 65° C. was raised, the reactor has been maintained under agitation for others 8 hours and a polyurethane-polyurea solution, stable in time, with viscosity of 18,000 mPa·sec at 20° C. has been obtained. The elastomer solution thus prepared was diluted with N,N-dimethylformamide, containing 5.1 g of Irganox 1098 and 15.4 g of Tinuvin 350 to form a 14% solution by weight. By water coagulation of a film of the solution thus prepared, a polymer with high porosity was obtained. The solution was then used to impregnate a D1 felt, which was subjected to all the operations and characterizations described in Example 5.

EXAMPLE NO 8

117 g of PHC, 73 g of PDPA and 102 g of PBA (all of molecular weight 2,000) were reacted with 187 g of MDI, using a diisocyanate/diol molar ratio of 10/1 in the same reactor and under the same operating conditions described in example 5. Three hours after the beginning of the reaction, the pre-polymer thus obtained was diluted with DMF, which humidity content was 0.03%, to give a 25% pre-polymer solution with a free NCO content of 2.8%.

Then, 36.2 g of MEG as chain extender dissolved in 108.6 g of DMF was added. The reactor was maintained under agitation for a further 12 hours and a polyurethane solution, stable in time, with viscosity of 54,000 mPa·sec at 20° C. has been obtained. The elastomer solution thus prepared was diluted with N,N-dimethylformamide, containing 5.1 g of Irganox 1098 and 15.4 g of Tinuvin 350 to form a 14% solution by weight. By water coagulation of a film of the solution thus prepared, a polymer with low porosity was obtained.

The solution was then used to impregnate a D1 felt, which was subjected to all the operations and characterizations described in Example 5.

EXAMPLE NO 9

204 g of PHC and 88 g of PNA (both of molecular weight 2,000) were reacted with 187 g of MDI, using a diisocyanate/diol molar ratio of 10/1 in the same reactor and under the same operating conditions described in example 5. Three hours after the beginning of the reaction, the pre-polymer thus obtained was diluted with DMF, to give a 25% pre-polymer solution with a free NCO content of 2.8%.

Then, 36.2 g of MEG as chain extender dissolved in 108.6 g of DMF was added. The reactor was maintained under agitation for a further 12 hours, to produce a polyurethane solution, stable in time, with viscosity of 60,000 mPa·sec at 20° C. The elastomer solution thus prepared was then diluted with N,N-dimethylformamide, containing 5.1 g of Irganox 1098 and 15.4 g of Tinuvin 350 to form a 14% solution by weight. By water coagulation of a film of the solution thus prepared, a polymer with low porosity was obtained.

The solution was then used to impregnate a D1 felt, which was subjected to all the operations and characterizations described in Example 5.

EXAMPLE NO 10

266 g of PHC of molecular weight 2,700 and 114 g of PNA of molecular weight 1,260 were reacted with 139.4 g of MDI, with a 2.9/1 diisocyanate/diol molar ratio, in a 2.5 liter capacity reactor with mechanical stirrer, at 65° C. under nitrogen. Three hours after the beginning of the reaction, the pre-polymer thus obtained was cooled to 45° C. and diluted with DMF, which humidity content was 0.03%, to give a 25% pre-polymer solution with a free NCO content of 1.46%.

Then, maintaining the temperature at 45° C., 3.1 g of DBA and 5.9 g of Water dissolved in 117.3 g of DMF were added slowly over 60 minutes, so as to have a polyurethane-polyurea of calculated molecular weight of 43,000. After that, the temperature was raised to 65° C. and the reactor was maintained under agitation for a further 8 hours, to produce a polyurethane-polyurea solution, stable in time, with viscosity of 35,000 mPa·sec at 20° C. The elastomer solution thus prepared was diluted with N,N-dimethylformamide, containing 5.1 g of Irganox 1098 and 15.4 g of Tinuvin 350 to form a 14% solution by weight. By water coagulation of a film of the solution thus prepared an high porosity film has been obtained.

The solution was then used to impregnate a D1 felt, which was subjected to all the operations and characterizations described in Example 5.

EXAMPLE NO 11

266 g of PHC of molecular weight 1,800 and 114 g of PNA of molecular weight 2,700 were reacted with 139.4 g of MDI, with a 2.9/1 diisocyanate/diol molar ratio, in a 2.5 liter capacity reactor with mechanical stirrer, at 65° C. under nitrogen. Three hours after the beginning of the reaction, the pre-polymer thus obtained was cooled to 45° C. and diluted with DMF, which humidity content was 0.03%, to give a 25% pre-polymer solution with a free NCO content of 1.46%.

Then, maintaining the temperature at 45° C., 3.1 g of DBA and 5.9 g of Water dissolved in 117.3 g of DMF were added slowly over 30 minutes, so as to have a polyurethane-polyurea of calculated molecular weight of 43,000. After that, the temperature was raised to 65° C. and the reactor was maintained under agitation for a further 8 hours, to produce a polyurethane-polyurea solution, stable in time, with viscosity of 28,000 mPa·sec at 20° C. The elastomer solution thus prepared was diluted with N,N-dimethylformamide, containing 5.1 g of Irganox 1098 and 15.4 g of Tinuvin 350 to form a 14% solution by weight. By water coagulation of the solution thus prepared an high porosity film has been obtained.

The solution was then used to impregnate a D1 felt, which was subjected to all the operations and characterizations described in Example 5.

EXAMPLE NO 12

266 g of PHC of molecular weight 2,000 and 114 g of PNA of molecular weight 2,000 were reacted with 186.9 g of MDI, using a diisocyanate/diol molar ratio of 3.9/1 in a 2.5 liter capacity reactor reactor with mechanical stirrer, at 65° C. under nitrogen. Three hours after the beginning of the reaction, the pre-polymer thus obtained was cooled to a temperature of 45° C. and diluted with DMF, which a humidity content was 0.03%, to give a 25% pre-polymer solution with a free NCO content of 2.1%.

Then, maintaining the temperature at 45° C., 3.1 g of DBA and 9.2 g of Water dissolved in 102.7 g of DMF were added slowly over 5 minutes, so as to have a polyurethane-polyurea of calculated molecular weight of 46,500. After that, the temperature was raised to 65° C. and reactor was maintained under agitation for a further 8 hours, to produce a polyurethane-polyurea solution, stable in time, with viscosity of 52,000 mPa·sec at 20° C. The elastomer solution thus prepared was diluted with N,N-dimethylformamide, containing 5.1 g of Irganox 1098 and 15.4 g of Tinuvin 350 to form a 14% solution by weight. By water coagulation of the solution thus prepared an high porosity film has been obtained.

The solution was then used to impregnate a D1 felt, which was subjected to all the operations and characterizations described in Example 5.

EXAMPLE NO 13

266 g of PHC of molecular weight 2,000 and 114 g of PNA of molecular weight 2,000 were reacted with 139.4 g of MDI, with a 2.9/1 diisocyanate/diol molar ratio, in a 2.5 liter reactor with mechanical stirrer, at 65° C. under nitrogen. Three hours after the beginning of the reaction, the pre-polymer thus obtained was cooled to 45° C. and diluted with DMF, which humidity content was 0.03%, to give a 14% pre-polymer solution with a free NCO content of 0.765%.

Then, maintaining the temperature at 45° C., 3.1 g of DBA and 5.9 g of Water dissolved in 244.1 g of DMF were added slowly over 60 minutes, so as to have a polyurethane-polyurea with a calculated molecular weight of 43,000. After that, the temperature was raised to 65° C. and reactor was maintained under agitation for a further 12 hours, to produce a polyurethane-polyurea solution, stable in time, with viscosity of 1,040 mPa·sec at 20° C. The elastomer solution thus prepared was diluted with N,N-dimethylformamide, containing 5.1 g of Irganox 1098 and 15.4 g of Tinuvin 350 to form a 14% solution by weight. By water coagulation of a film of the solution thus prepared an high porosity film has been obtained.

The solution was then used to impregnate a D1 felt, which was subjected to all the operations and characterizations described in Example 5.

EXAMPLE NO 14

266 g of PHC of molecular weight 2,000 and 114 g of PNA of molecular weight 2,000 were reacted with 139.4 g of MDI, using a diisocyanate/diol molar ratio of 2.9/1 in a 2.5 liter capacity reactor with mechanical stirrer, at 65° C. under nitrogen. Three hours after the beginning of the reaction, the pre-polymer thus obtained was cooled to a temperature of 45° C. and diluted with DMF, which humidity content was 0.03%, to give a 30% pre-polymer solution with a free NCO content of 1.77%.

Then, maintaining the temperature at 45° C., 3.1 g of DBA and 5.9 g of Water dissolved in 90.9 of DMF were added slowly over 2 minutes, so as to have a polyurethane-polyurea of calculated molecular weight of 43,000. After that, temperature of 65° C. was raised, the reactor has been maintained under agitation for a further 8 hours and a polyurethane-polyurea solution, stable in time, with viscosity of 80,000 mPa·sec at 20° C. has been obtained. The elastomer solution thus prepared was diluted with N,N-dimethylformamide, containing 5.1 g of Irganox 1098 and 15.4 g of Tinuvin 350 to form a 14% solution by weight. By water coagulation of a film of the solution thus prepared, a polymer with high porosity was obtained.

The solution was then used to impregnate a D1 felt, which was subjected to all the operations and characterizations described in Example 5.

EXAMPLE NO 15

266 g of PHC and 114 g of PNA (both of molecular weight 2,000) were reacted with 99.1 g of TDI, using a diisocyanate/diol molar ratio of 3/1 in a 2.5 liter capacity reactor reactor with mechanical stirrer, at 65° C. under nitrogen. Four hours after the beginning of the reaction, the pre-polymer thus obtained is cooled to a temperature of 45° C. and diluted with DMF, which humidity content was 0.03%, to give a 25% pre-polymer solution with a free NCO content of 1.53%.

Then, maintaining the temperature at 45° C., 2.0 g of DBA and 6.2 g of Water dissolved in 131.0 g of DMF were added slowly over 60 minutes, so as to have a polyurethane-polyurea of calculated molecular weight of 64,000. After that, temperature of 65° C. was raised, the reactor has been maintained under agitation for a further 12 hours, to produce a polyurethane-polyurea solution, stable in time, with viscosity of 21,500 mPa·sec at 20° C. The elastomer solution thus prepared was diluted with N,N-dimethylformamide, containing 5.1 g of Irganox 1098 and 15.4 g of Tinuvin 350 to form a 14% solution by weight. By water coagulation of a film of the solution thus prepared, a polymer with high porosity was obtained.

The solution was then used to impregnate a D1 felt, which was subjected to all the operations and characterizations described in Example 5.

EXAMPLE NO 16

266 g of PHC and 114 g of PNA (both of molecular weight 2,000) were reacted with 71.2 g of MDI and 49.5 g of TDI, using a diisocyanate/diol molar ratio of 3/1 in a 2.5 liter capacity reactor with mechanical stirrer, at 65° C. under nitrogen. Four hours after the beginning of the reaction, the pre-polymer thus obtained was cooled to a temperature of 30° C. and diluted with DMF, which humidity content was 0.03%, to give a 25% pre-polymer solution with a free NCO content of 1.46%.

Then, maintaining the temperature at 30° C., 2.9 g of DBA and 6.1 g of Water dissolved in 170.6 g of DMF were added slowly over 60 minutes, so as to have a polyurethane-polyurea of calculated molecular weight of 46,000. After that, the reactor has been maintained under agitation for a further 11 hours and a polyurethane-polyurea solution, stable in time, with viscosity of 19,500 mPa·sec at 20° C. has been obtained. The elastomer solution thus prepared was diluted with N,N-dimethylformamide, containing 5.1 g of Irganox 1098 and 15.4 g of Tinuvin 350 to form a 14% solution by weight. By water coagulation of a film of the solution thus prepared, a polymer with high porosity was obtained.

The solution was then used to impregnate a D1 felt, which was subjected to all the operations and characterizations described in Example 5.

EXAMPLE NO 17

266 g of PHC and 114 g of PNA (both of molecular weight 2,000) were reacted with 126.5 g of IPDI, with a 3/1 diisocyanate/diol molar ratio, using 0.04 g of DBTDL as a catalyst, in the same reactor and under the same operating conditions described in example 5. Three hours after the beginning of the reaction, the pre-polymer thus obtained was cooled to a temperature of 45° C. and diluted with DMF, which humidity content was 0.03%, to give a 35% pre-polymer solution with a free NCO content of 2.1%.

Then, maintaining the temperature at 45° C., 2.0 g of DBA and 59.5 g of IPDA dissolved in 114.3 g of DMF were added slowly over 5 minutes, so as to have a polyurethane-polyurea of calculated molecular weight of 69,000. After that, temperature of 65° C. was raised, the reactor has been maintained under agitation for a further 6 hours and a polyurethane-polyurea solution, stable in time, with viscosity of 35,800 mPa·sec at 20° C. has been obtained. The elastomer solution thus prepared was diluted with N,N-dimethylformamide, containing 5.1 g of Irganox 1098 and 15.4 g of Tinuvin 350 to form a 14% solution by weight. The solution was then used to impregnate a D1 felt, which was subjected to all the operations and characterizations described in Example 5.

EXAMPLE NO 18

The reaction was carried out in the same way of Example 5, applying the following differences:
DMAC was used in place of DMF giving finally a polyurethane-polyurea of calculated molecular weight of 43,000 and with viscosity of 16,000 mPa·sec at 20° C. The elastomer solution thus prepared was diluted with N,N-dimethylacetamide, containing 5.1 g of Irganox 1098 and 15.4 g of Tinuvin 350 to form a 14% solution by weight. The solution was then used to impregnate a D1 felt, which was subjected to all the operations and characterizations described in Example 5.

EXAMPLE NO 19

The reaction was carried out in the same way of Example 5, applying the following differences:
the prepolymerization reaction was carried out in the presence of DMF. Therefore 266 g of PHC and 114 g of PNA (both of molecular weight 2,000) were reacted with 139.4 g of MDI, using a diisocyanate/diol molar ratio of 2.9/1 in a 2.5 liter capacity reactor with mechanical stirrer, at 65° C. under nitrogen, in the presence of DMF with a humidity content of 0.03% to give a 30% prepolymer solution. After three hours of reaction time, a diluted pre-polymer was obtained with a free NCO content of 1.66%.

Then, after temperature decreased to 45° C., 3.1 g of DBA and 5.9 g of Water dissolved in 117.3 g of DMF were added slowly over 10 minutes, so as to have a polyurethane-polyurea of calculated molecular weight of 43,000. After that, temperature of 65° C. was raised, the reactor has been maintained under agitation for a further 8 hours and a polyurethane-polyurea solution, stable in time, with viscosity of 42,000 mPa·sec at 20° C. has been obtained. The elastomer solution thus prepared was diluted with N,N-dimethylformamide, containing 5.1 g of Irganox 1098 and 15.4 g of Tinuvin 350 to form a 14% solution by weight. By water coagulation of a film of the solution thus prepared, a polymer with high porosity was obtained.

The solution was then used to impregnate a D1 felt, which was subjected to all the operations and characterizations described in Example 5.

EXAMPLE NO 20

190 g of PHC and 190 g of PNA (both of molecular weight 2,000) were reacted with 139.4 g of MDI, with a 2.9/1 diisocyanate/diol molar ratio, in a 2.5 liter capacity reactor, at 80° C., in nitrogen atmosphere. Two hours after the beginning of the reaction, the pre-polymer thus obtained was cooled to 60° C. and was diluted with DMF, which humidity content was 0.44% to give a 25% pre-polymer solution. Then, maintaining the temperature at 60° C., 3.5 g of DBA dissolved in 117.3 g of DMF were added rapidly, so as to give a polyurethane-polyurea of calculated molecular weight of 43,000. Keeping the temperature at 60° C., the reactor was maintained under agitation for a further 8 hours to produce a polyurethane-polyurea solution, stable in time, with viscosity of 21,000 mPa·sec at 20° C. The elastomer solution thus prepared was diluted with N,N-dimethylformamide, containing 5.1 g of Irganox 1098 and 15.4 g of Tinuvin 350 to form a 14% solution by weight. By water coagulation of a film of the solution thus prepared an high porosity film has been obtained.

The solution was then used to impregnate a D1 felt, which was subjected to all the operations and characterizations described in Example 5.

EXAMPLE NO 21

As for example no 5, using D2 a felt instead of D1.

EXAMPLE NO 22

As for example no 5, using D3 a felt instead of D1.

EXAMPLE NO 23

As for example no 5, using D4 a felt instead of D1.

TABLE 1

| | EXAMPLE N. | | | | | | | | |
|---|---|---|---|---|---|---|---|---|---|
| | 5 | 6 | 7 | 8 | 9 | 10 | 11 | 12 | 13 |
| DRY FILMS CHARACTERISTICS | | | | | | | | | |
| Melting point, by DCS, ° C. | >270 | >270 | 250 | 170 | 180 | >270 | 250 | >270 | >270 |
| FINAL GOOD CHARACTERISTICS AFTER AGEINGS | | | | | | | | | |
| MOLECULAR WEIGHT RETENTION (Mn) AFTER AGEINGS, BY GPC ANALYSIS, % (*) | | | | | | | | | |
| Xenotest 1200 | 93 | 50 | 90 | 92 | 90 | 95 | 90 | 95 | 92 |
| Jungle Test 5 weeks | 85 | 70 | 60 | 80 | 95 | 93 | 88 | 89 | 85 |
| Jungle Test 7 weeks | 75 | 65 | 40 | 60 | 90 | 91 | 86 | 85 | 70 |
| Jungle Test 10 weeks | 65 | 55 | 30 | 45 | 70 | 75 | 70 | 80 | 63 |
| ABRASION RESISTANCE AFTER 20.000 CYCLES OF MARTINDALE, WITH A 12 Kpa LOAD (5 SCORES SCALE) | | | | | | | | | |
| Xenotest 1200 | 4 | 1 | 4 | 4 | 4 | 4 | 4 | 4 | 4 |
| Jungle Test 5 weeks | 4–5 | 4–5 | 3–4 | 4 | 4–5 | 4–5 | 4–5 | 4–5 | 4–5 |
| Jungle Test 7 weeks | 4–5 | 4 | 2–3 | 4 | 4–5 | 4–5 | 4 | 4–5 | 4–5 |
| Jungle Test 10 weeks | 4 | 2–3 | 1 | 3–4 | 4 | 4 | 3–4 | 4 | 4 |
| TENSILE STRENGTH RETENTION AFTER AGEINGS, % (*) | | | | | | | | | |
| Xenotest 1200 | 95 | 60 | 91 | 90 | 95 | 96 | 93 | 95 | 92 |
| Jungle Test 5 weeks | 90 | 90 | 87 | 90 | 95 | 95 | 89 | 95 | 90 |
| Jungle Test 7 weeks | 90 | 90 | 62 | 85 | 92 | 93 | 84 | 90 | 88 |
| Jungle Test 10 weeks | 80 | 80 | 40 | 72 | 90 | 90 | 80 | 88 | 78 |

TABLE 2

| | EXAMPLE N. | | | | | | | | | |
|---|---|---|---|---|---|---|---|---|---|---|
| | 14 | 15 | 16 | 17 | 18 | 19 | 20 | 21 | 22 | 23 |
| Melting point by DCS, ° C. | >270 | 240 | 255 | 250 | >270 | >270 | 200 | Like in example 5 | | |
| FINAL GOOD CHARACTERISTICS AFTER AGEINGS | | | | | | | | | | |
| MOLECULAR WEIGHT RETENTION (Mn) AFTER AGEINGS, BY GPC ANALYSIS, % (*) | | | | | | | | | | |
| Xenotest 1200 | 92 | 89 | 91 | 96 | 92 | 93 | 92 | Like in example 5 | | |
| Jungle Test 5 weeks | 86 | 85 | 85 | 86 | 83 | 84 | 64 | | | |
| Jungle Test 7 weeks | 72 | 70 | 71 | 71 | 74 | 76 | 45 | | | |
| Jungle Test 10 weeks | 64 | 63 | 64 | 61 | 66 | 66 | 38 | | | |
| ABRASION RESISTANCE AFTER 20.000 CYCLES OF MARTINDALE, WITH A 12 Kpa LOAD (5 SCORES SCALE) | | | | | | | | | | |
| Xenotest 1200 | 4 | 4 | 4 | 5 | 4 | 4 | 4 | 1 | 1 | 4 |
| Jungle Test 5 weeks | 4–5 | 4 | 4 | 4–5 | 4–5 | 4–5 | 4–5 | 4 | 4 | 4–5 |
| Jungle Test 7 weeks | 4–5 | 4 | 4 | 4–5 | 4–5 | 4–5 | 4 | 3–4 | 3–4 | 4–5 |
| Jungle Test 10 weeks | 4 | 3–4 | 3–4 | 4 | 4 | 4 | 3–4 | 3 | 3 | 4 |
| TENSILE STRENGTH RETENTION AFTER AGEINGS, % (*) | | | | | | | | | | |
| Xenotest 1200 | 91 | 89 | 90 | 95 | 91 | 92 | 93 | 80 | 81 | 93 |
| Jungle Test 5 weeks | 89 | 86 | 87 | 92 | 89 | 90 | 90 | 70 | 72 | 89 |
| Jungle Test 7 weeks | 87 | 80 | 83 | 89 | 88 | 91 | 85 | 68 | 70 | 88 |
| Jungle Test 10 weeks | 80 | 76 | 78 | 84 | 82 | 78 | 80 | 53 | 55 | 78 |

The invention claimed is:

1. A method for producing a micro-porous, compact material with high durability performance comprising:
impregnating a non-woven felt with a polyurethane including soft segments and hard segments during a dilution step, the polyurethane resistant to treatment at temperatures above about 250° C., wherein the soft segments consists of at least one polycarbonate-polyol selected from the group consisting of polypentamethylenecarbonatoglycol, polyhexamethylenecarbonatoglycol and polyheptamethylenecarbonatoglycol and at least one polyester-polyol selected from the group consisting of: polyhexamethyleneadipateglycol, polyneopentyladipateglycol, and polycaprolactonediol, and the hard segments comprise ureic groups derived from a reaction between free isocyanate groups and water, thereby forming an extension agent during the reaction.

2. The method according to claim 1, wherein a weight ratio of the polycarbonate to polyester polyols is between about 80/20 and about 20/80.

3. The method according to claim 2, wherein a weight ratio of polycarbonate to polyester diols is equal to approximately 70/30.

4. The method according to claim 1, obtained by water chain extension of a polyurethane prepolymer carried out in two stages comprising:
adding water to a solvent to form an intermediate prepolymer in a pre-polymerization step; and
reacting the free isocyanate groups and the water.

5. The method according to claim 4, wherein the adding water step is carried out at a temperature between about 30° C. and about 60°and over a time range between about 2 and about 120 minutes.

6. The method according to claim 4, wherein the dilution step with solvent and extension with water are carried out contemporaneously.

7. The method according to claim 4, wherein the pre-polymerization step is carried out in presence of a same solvent as the dilution step.

8. The method according to claim 4, wherein the solvent can be at least one of: N,N-dimethylformamide and N,N-dimethylacetamide.

9. The method according to claim 4, wherein the prepolymer is obtained by a reaction between diisocyanate and a mixture by weight, from about 0.1/0.9 to about 0.9/0.1 and preferably from about 0.7/0.3 to about 0.5/0.5, of polycarbonate diol and polyester diol having calculated molecular weight of between about 1,300 and about 2,700.

10. The method according to claim 1, wherein the free isocyanate groups include a diisocyanate selected from the group consisting of: 2–4/2–6-toluenediisocyanate; 3-isocyanomethyl 3,5,5-trimethyl cyclohexyl isocyanate; 4–4'-diphenylmethanodiisocyanate; and combinations thereof.

11. The method according to claim 10, where a diisocyanate/diol molar ratio ranges between 2.9 and 3.1 and pre-polymerization is carried out with a reaction time ranges between about 2 and about 4 hours and with a temperature between about 35° C. and about 80° C.

12. The method according to claim 1, wherein the extension reaction is carried out with a water/diols molar ratio of between about 1.2/1 and about 2.0/1.

13. The method according to claim 1, wherein the water extension is carried out in presence of n-dibutylamine, with a n-dibutylamine/diols molar ratio between about 0.080/1 and about 0.140/1.

14. The method according to claim 1, wherein polyurethane-polyurea thus obtained shows a melting point, measured by means of DSC, above about 250° C.

15. The method according to claim 1, wherein the non-woven fabric is obtained by co-extrusion of a polyethyleneterephthalate, polytrimethyleneterephthalate, polyamide—6 or polyamide—6—6 micro-fibers in a polystyrene matrix, and formation of non-woven fabric with such coestrusion, its impregnation with polyvinyl alcohol, the following elimination of polystyrene matrix, impregnation with polyurethane, its squeezing by passage between rollers, polyurethane coagulation in a water bath, drying, cutting into sheets with a pre-set thickness, emery polishing and final dyeing and finishing treatments.

16. The method according to claim 1 wherein the micro-porous, compact material is a synthetic chamois leather, with high durability.

17. The method according to claim 1 wherein a polyurethane-polyurea polymer is obtained following final evaporation of the solvent.

18. A method for producing a micro-porous, compact material with high durability performance comprising:
impregnating a non-woven felt with a polyurethane including soft segments and hard segments during a dilution step, the polyurethane resistant to treatment at temperatures above about 250° C., wherein the soft segments consisting essentially of a mixture of polyhexamethylenecarbonatoglycol and polyneopentyladipateglycol and the hard segments comprise ureic groups derived from a reaction between free isocyanate groups and water, thereby forming an extension agent during the reaction.

19. A method for producing a micro-porous, compact material with high durability performance comprising:
impregnating a non-woven felt with a polyurethane including soft segments and hard segments during a dilution step, the polyurethane resistant to treatment at temperatures above about 2500 C., wherein the soft segments consisting essentially of a mixture of polyheptamethylenecarbonatoglycol and a polyester polyol selected from the group consisting of: polyhexamethyleneadipateglycol; polyneopentyladipateglycol; polytetramethyleneadipateglycol and combinations thereof, and the hard segments comprise ureic groups derived from a reaction between free isocyanate groups and water, thereby forming an extension agent during the reaction.

* * * * *

UNITED STATES PATENT AND TRADEMARK OFFICE
CERTIFICATE OF CORRECTION

| | |
|---|---|
| PATENT NO. | : 7,144,535 B2 |
| APPLICATION NO. | : 10/325695 |
| DATED | : December 5, 2006 |
| INVENTOR(S) | : Andrea Bellucci et al. |

It is certified that error appears in the above-identified patent and that said Letters Patent is hereby corrected as shown below:

Column 16, line 35 (claim 18), remove "essentially";

Column 16, line 48 (claim 19), remove "essentially";

Column 16, line 47 (claim 19), remove "2500" and replace with --250°--.

Signed and Sealed this

Sixth Day of March, 2007

JON W. DUDAS
*Director of the United States Patent and Trademark Office*